United States Patent [19]
Greenbaum

[11] Patent Number: 4,476,105
[45] Date of Patent: Oct. 9, 1984

[54] PROCESS FOR PHOTOSYNTHETICALLY SPLITTING WATER

[75] Inventor: Elias Greenbaum, Oak Ridge, Tenn.

[73] Assignee: The United States of America as represented by the United States Department of Energy, Washington, D.C.

[21] Appl. No.: 343,666

[22] Filed: Jan. 28, 1982

[51] Int. Cl.³ .............................................. C01B 13/00
[52] U.S. Cl. ..................................... 423/648 R; 55/3; 423/579
[58] Field of Search .................. 423/579, 648 R; 55/3

[56] References Cited

U.S. PATENT DOCUMENTS 4,053,576 10/1977 Fletcher ............................. 423/579

FOREIGN PATENT DOCUMENTS 689047 6/1964 Canada ..................................... 55/3
2481251 10/1981 France ................................. 423/579

OTHER PUBLICATIONS

Babor, *Basic College Chemistry*, Second Edition, Thomas Y. Crowell Company (1953), pp. 274-276.
E. Greenbaum, "Simultaneous Photoproduction of Hydrogen and Oxygen by Photosynthesis", Biotechnology and Bioengineering Symposium No. 10, John Wiley & Sons, 1980.
Curl, "Direct Thermomagnetic Splitting of Water," *Int. J. Hydrogen Energy*, vol. 4, pp. 13-20, Permagon Press Ltd., 1979.

*Primary Examiner*—John Doll
*Assistant Examiner*—Wayne A. Langel
*Attorney, Agent, or Firm*—Fred O. Lewis; Stephen D. Hamel; Michael F. Esposito

[57] ABSTRACT

The invention is an improved process for producing gaseous hydrogen and oxygen from water. The process is conducted in a photolytic reactor which contains a water-suspension of a photoactive material containing a hydrogen-liberating catalyst. The reactor also includes a volume for receiving gaseous hydrogen and oxygen evolved from the liquid phase. To avoid oxygen-inactivation of the catalyst, the reactor is evacuated continuously by an external pump which circulates the evolved gases through means for selectively recovering hydrogen therefrom. The pump also cools the reactor by evaporating water from the liquid phase. Preferably, product recovery is effected by selectively diffusing the hydrogen through a heated semipermeable membrane, while maintaining across the membrane a magnetic field gradient which biases the oxygen away from the heated membrane. This promotes separation, minimizes the back-reaction of hydrogen and oxygen, and protects the membrane.

11 Claims, 3 Drawing Figures

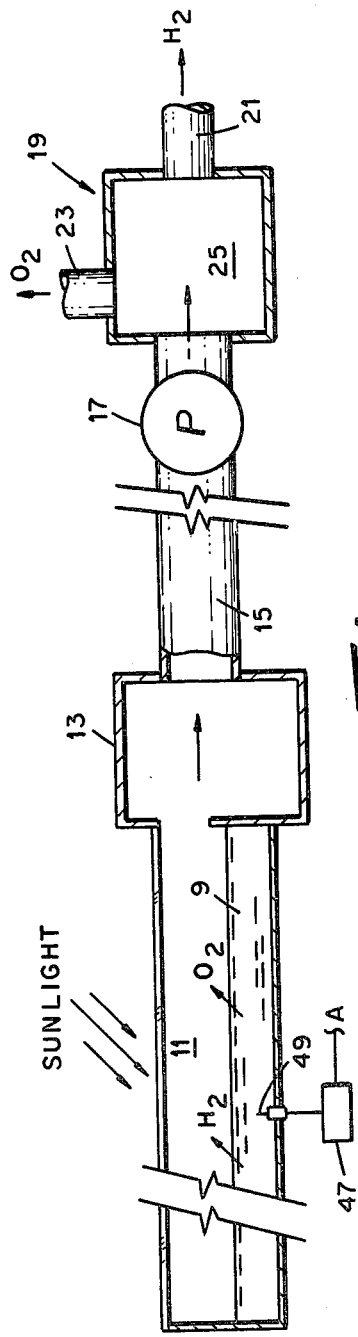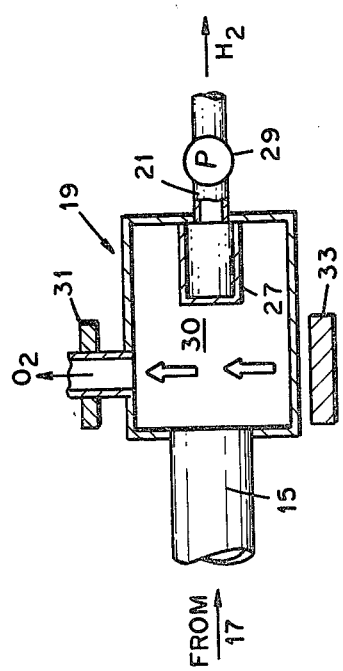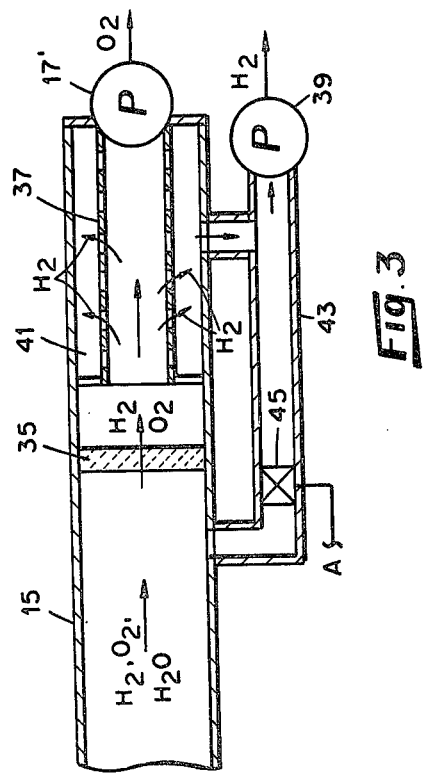

PROCESS FOR PHOTOSYNTHETICALLY SPLITTING WATER

BACKGROUND OF THE INVENTION

This invention is a result of a contract with the U.S. Department of Energy. This invention relates generally to processes for the production of gaseous hydrogen and/or oxygen by photosynthesis. More particularly, it relates to improvements in a water-splitting process wherein splitting is effected by directing visible light onto water which contains a photolytic material incorporating a catalyst as a hydrogen-liberator. In biological systems, the catalyst is the enzyme hydrogenase. As used herein, the term photosynthesis is defined as the light-induced cleavage of water into molecular hydrogen and oxygen wherein the photocatalysts that participate in the reaction may be of biological or non-biological origin.

At this time, there are four experimentally verified photosynthetic systems for splitting water to produce molecular hydrogen and oxygen simultaneously. Two of the systems utilize living algae (e.g., green or blue-green algae) as the hydrogen source. A third so-called chloroplast system utilizes non-living components extracted from plants and bacteria as the hydrogen source. The fourth is a purely photochemical system containing no biological components; this system is composed of pigments and precious-metal catalysts with associated electron carriers. The three biological systems employ hydrogenase enzyme as a hydrogen-liberator. Because the hydrogenase cannot function or be synthesized when exposed to oxygen at partial pressures above a certain level, it is essential that the water-splitting be initiated anaerobically and conducted under conditions limiting the buildup of photosynthetically produced gaseous oxygen. Hitherto, oxygen buildup has been limited to acceptable concentrations by either chemically trapping the evolved gaseous oxygen while it is within the liquid medium or by continuously purging the region above the liquid medium with a non-reactive sweep gas, such as helium. Neither of these techniques for preventing oxygen-inactivation of the hydrogenase is suitable for the production of hydrogen on a practical scale because chemical trapping entails excessive energy losses and because sweep gases introduce gaseous diluents which seriously interfere with subsequent recovery of the hydrogen.

The following publications relate to photosynthesis processes for the production of hydrogen: J. R. Benneman et al., Bioengineering Aspects of Biophotolysis, *Enzyme and Microbial Technology*, 2, 103-111 (1980); T. W. Jeffries et al., Biosolar Production of Fuels from Algae, Report UCRL-62177, Lawrence Livermore Laboratory (1976); E. Greenbaum, The Photosynthetic Unit of Hydrogen Evolution *Science*, 196, 878-879 (1977); E. Greenbaum, Biosolar Hydrogen Production, *Oak Ridge National Laboratory Review*, Summer Issue, 25-29 (1980). E. Greenbaum, Simultaneous Photoproduction of Hydrogen and Oxygen by Photosynthesis, *Biotechnology and Bioengineering Symposium No.* 10, 1-13, John Wiley & Sons, Inc. (1980). R. Radmer et al., Measurement of the Oxygen Cycle: The Mass Spectrometric Analysis of Gases Dissolved in a Liquid Phase, *Methods in Enzymology*, Vol. 69, pp. 547-60 (1980): E. Borgarello et al., Photochemical Cleavage of Water by Photocatalysis, *Nature*, 289, 158-59 (1981). The above listed article by Jeffries et al. states without elaboration that gaseous hydrogen and oxygen may be separated from each other by means of inert (i.e., non-catalytic) membranes or by magnetic attraction.

The following U.S. patents relate to the use of magnetic field gradients to recover dissolved oxygen from liquids: Pat. No. 4,049,398, issued on Sept. 20, 1977, and Pat. No. 4,203,740, issued on May 20, 1980. Some commercial oxygen analyzers, such as model 802, manufactured by Mine Safety Appliances, Co., use magnetic field gradients to separate oxygen from gaseous mixtures. The separation of gases by effusion (commonly referred to as "gaseous diffusion") is discussed in detail in the following publication: *Encyclopedia of Chemical Technology*, Vol. 7, pp. 92-118, John Wiley & Sons (1965). All of the above-cited publications are incorporated herein by reference.

It is an object of this invention to provide a novel process for photosynthetically splitting water to produce gaseous hydrogen.

It is another object to provide an improved photosynthetic water-splitting process eliminating the need for chemical traps for consuming photosynthetically evolved gaseous oxygen.

It is another object to provide an improved photosynthetic water-splitting process eliminating the need for a sweep gas for purging gaseous hydrogen and oxygen from a photolytic reactor.

It is another object to provide a photosynthetic water-splitting process characterized by a novel method of separating gaseous hydrogen and oxygen.

Other objects and advantages will be made apparent hereinafter.

SUMMARY OF THE INVENTION

In one form of the invention, hydrogen is produced by providing a reactor containing a body of water. The water contains photolytic material i.e., photoactive material containing a hydrogen-catalyst. The interior of the reactor is isolated from atmosphere and includes a volume for receiving gases evolved from the body of water. The photolytic material is exposed to light to effect photosynthetic splitting of the water into gaseous hydrogen and oxygen. The gas-receiving volume is continuously evacuated by pumping to promote evolution of gaseous hydrogen and oxygen into that volume and to withdraw them therefrom. In another form of the invention, separation of the hydrogen and oxygen is effected by selectively diffusing the hydrogen through a heated semipermeable membrane in a separation zone while maintaining across the zone a magnetic field gradient biasing the oxygen away from the membrane. In a third form of the invention, the withdrawn gas is contacted with a membrane blocking flow of water vapor to the region for effecting recovery of the hydrogen. In a fourth embodiment, the invention comprises a process for selectively recovering hydrogen from a gas mixture comprising hydrogen and oxygen. The process is conducted in a separation zone and comprises contacting the mixture with a semipermeable membrane effecting selective diffusion of hydrogen while maintaining across the zone a magnetic field gradient effecting movement of oxygen in a direction away from the membrane.

BRIEF DESCRIPTION OF THE DRAWINGS

FIG. 1 is a schematic diagram of a system for conducting the process of this invention, FIG. 2 is a more detailed showing of a gas-separation arrangement designated as 19 in FIG. 1, and FIG. 3 is a schematic showing of an alternative arrangement for processing gases withdrawn from a line designated as 15 in FIG. 1.

DETAILED DESCRIPTION OF THE INVENTION

Briefly, my photosynthetic water-splitting process is designed for efficient operation. The process avoids the above-mentioned limitations imposed by chemical traps and purge gases, and utilizes novel and efficient techniques for the recovery of hydrogen.

FIG. 1 is a schematic showing of a system designed for the simultaneous photoproduction of hydrogen and oxygen in accordance with the invention. The system includes an elongated photolytic reactor 7 for containing a liquid medium 9 and exposing the same to sunlight. The interior of the reactor is isolated from atmosphere, and at least the upper portion of the reactor is transparent. The liquid medium 9 comprises a water-dispersion of any suitable catalyst-containing photoactive material, such as those mentioned above (see "Background"). Preferably, the liquid medium is agitated continuously to promote escape of gases therefrom. Agitation may be accomplished by any suitable means, as by a magnetically driven armature or mixer in the liquid.

As shown, the surface of the liquid medium is exposed to a reactor volume 11 for receiving gases evolved from the liquid. The volume 11 is in communication with a header 13, which preferably is connected to receive evolved gases from a plurality of reactors similar to 7. In accordance with the invention, the header is connected, through an elongated line 15, to the inlet of a pump 17 for removing evolved gases (principally oxygen, hydrogen, and water vapor) from the volume 11. The recovered hydrogen is discharged through an outlet 21; oxygen and water vapor are discharged through an outlet 23.

FIG. 2 illustrates the preferred design for the hydrogen recovery means 19. As shown, the discharge from the pump 17 is directed into a separation zone 30. Mounted in the zone is a heated semipermeable membrane 27 for selectively recovering hydrogen from the gas mixture withdrawn from the reactor. In the illustrated arrangement, the membrane is of tubular configuration, and an auxiliary pump 29 is provided to withdraw diffused hydrogen from the interior of the tubular membrane and discharge it, via an outlet 21, to any suitable storage or utilization system (not shown). The membrane 27 is maintained at an elevated temperature promoting diffusion of hydrogen therethrough.

In accordance with the invention, a magnetic field gradient is maintained across at least part of the separation zone 30 (FIG. 2) and is oriented to be traversed by the gas stream flowing toward the membrane 27. As indicated, the field is established by any suitable means, such as the opposed poles 31 and 33 of a suitable permanent magnet or d.c. electromagnet. As is known, (see above-referenced patents), oxygen molecules in a magnetic field move from a region of low intensity to a region of high intensity. Thus, in FIG. 2 the magnetic field intensity gradient is selected to remove oxygen molecules from the stream of gas approaching the semipermeable membrane 27. That is, the magnetic field gradient acts to selectively bias the paramagnetic oxygen away from the membrane for selectively recovering the hydrogen molecules. The resulting oxygen-rich gas leaves the reactor through line 23 and may be discharged, stored, or utilized, as desired.

Referring in more detail to the illustrative system shown in FIG. 1, the photolytic reactor 7 may be composed of glass or plastic. If, for example, the photoactive material is green algae, the temperature of the liquid medium preferably is maintained in the range of 5°-35° C. The pump 17 is designed to maintain the pressure in volume 11 below atmospheric. Referring to FIG. 2, the semipermeable membrane 23 may be a palladium-silver alloy and may be maintained at, say, 600° C. The desired magnetic field gradient is established by making the pole piece 33 of larger cross section than its companion pole 31. Alternatively, the desired gradient may be provided by eletromagnets whose coils are wound to provide the desired magnetic field gradient within the separation zone 25. All of the individual components utilized in the system shown in FIGS. 1 and 2 are commercially available or are well within the skill of the art. Conventional instrumentation is available to measure such parameters as concentration and composition of gaseous effluent, magnetic field strength, solar energy irradiance, temperature, and pressure.

In a normal operation of the above-described system, the pump 17 continuously removes evolved gases from the reactor 7 and discharges them into the hydrogen-recovery means 21. The hydrogen diffuses through the membrane 27 and is withdrawn therefrom by the pump 29. Oxygen and water vapor are vented through outlet 23. Water and/or photoactive material are withdrawn from or added to the reactor as desired.

The photosynthetic process disclosed above provides significant advantages over the known prior water-splitting art. For instance, the technique of pumping on the photolytic reactor is a highly advantageous departure from prior practice. That is, pumping on the reactor maintains the oxygen partial pressure in reactor volume 11 and thus in the liquid medium 9 at a value preventing inactivation of the hydrogenase enzyme. As a result, the water-splitting reaction may take place at the highest rate consistent with the other process parameters. This improvement is accomplished without introducing the complexities and inefficiencies attending the use of the usual chemical traps or sweep gases (see above). In addition, pumping on the reactor cools the liquid medium appreciably by evaporating water therefrom. Cooling ordinarily is required because the heating effect of the solar energy incident on the reactor may raise the temperature of the liquid medium to a value damaging the photoactive material. The pump 17 (FIG. 1) not only provides these advantages but also serves as the means for circulating the evolved gases through the separation means 19.

A second advantageous departure from water-splitting practice is the step of promoting hydrogen recovery by applying a magnetic field gradient to a semipermeable membrane. This technique for biasing the oxygen away from the membrane promotes separation efficiency in at least three ways: (1) oxygen molecules are preferentially swept toward the oxygen outlet 23; (2) the back-reaction of oxygen and hydrogen to reform water in zone 31 is restricted; (3) in instances where the heated membrane is not a noble metal but, say, iron, damaging oxidation of the membrane is minimized.

It is estimated that the combined effects of pumping on the reactor and separating the evolved gases in accordance with FIGS. 1 and 2 provide an improvement in overall process efficiency of about 100% or more as compared with the same process utilizing a sweep gas and separating the evolved hydrogen by diffusional techniques or cryogenically i.e., selectively liquefying the oxygen and recovering the hydrogen.

The improved process is not limited to the mode of hydrogen separation illustrated in FIG. 2; if desired, it may be used with other hydrogen-recovery techniques. FIG. 3 illustrates the process as designed to recover the hydrogen by effusion. In this form of the invention, a pump 17' is connected to aforementioned line 15 to evacuate the reactor volume. A membrane 35 is mounted in line 15 to block the flow of water vapor to the pump but permit the flow of hydrogen and oxygen. (One such membrane is MEM-213, manufactured by General Electric Company). The hydrogen and oxygen issuing from the membrane diffuse along the axis of a microporous "barrier" tube 37 for separating hydrogen and oxygen by diffusion (i.e., effusion). Pump 17' and a second pump 39 cooperatively maintain a selected pressure differential across the wall of the barrier tube, the pressure within the tube being the higher pressure. As shown, undiffused hydrogen-depleted gas flows to the pump 17' and is discharged therefrom. Diffused gas enriched in hydrogen flows into an annular compartment 41 and is withdrawn by the pump 39. The hydrophobic membrane 35 is provided to reduce pumping losses by blocking the flow of evolved water vapor into the effusion arrangement. To provide for periodic cooling of the liquid medium by evacuation, a bypass line 43 containing a solenoid valve 45 is connected across the hydrophobic membrane. Referring to FIG. 1, the valve is operated by any suitable electrical control circuit 47, which is responsive to the output of a thermocouple probe 49 for sensing the temperature of the liquid medium 9. Circuit 45 opens the valve when the sensed temperature exceeds a selected value and closes the same when the temperature decreases to a selected value.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, a magnetic field gradient may be maintained across the interface of the liquid medium 9 and the gas-receiving volume 11 (FIG. 1) to promote evolution of gases into the latter.

The embodiments disclosed herein were chosen and described in order to enable others skilled in the art to best utilize the invention in various embodiments and with various modifications as are suited to the particular use contemplated. It is intended that the scope of the invention be defined by the claims appended hereto.

What is claimed is:

1. A process for producing gaseous hydrogen, comprising:
   providing a reactor whose interior is isolated from atmosphere and which contains a body of water, said water containing photolytic material, said reactor including a volume for receiving gases evolved from said water,
   exposing said material in said reactor to visible light to effect photosynthetic splitting of said water into gaseous hydrogen and oxygen,
   pumping on said volume to maintain the oxygen partial pressure therein at a value preventing oxygen-inactivation of said hydrogenase by transferring a gaseous mixture comprising evolved hydrogen and oxygen from said volume into a separation zone, and
   separating the gaseous hydrogen and oxygen so withdrawn.

2. The process of claim 1 wherein the separating operation is effected by selectively diffusing the withdrawn gaseous hydrogen through a semipermeable membrane.

3. The process of claim 2 wherein said membrane comprises one of palladium and a palladium alloy.

4. The process of claim 1 wherein the separating operation is effected by preferentially effusing the gaseous hydrogen through a porous membrane.

5. The process of claim 1 wherein the separating operation is effected cryogenically.

6. The process of claim 1 further characterized by passing the gas withdrawn from said volume through a hydrophobic membrane prior to the separating operation.

7. A process for producing gaseous hydrogen, comprising:
   providing a reactor containing a body of water, said water containing biophotolytic material incorporating hydrogenase as a hydrogen-liberator, said reactor being isolated from atmosphere and having a volume for receiving gases evolved from said water,
   exposing said material in said reactor to light to effect photosynthetic splitting of said water into gaseous hydrogen and oxygen,
   pumping on said volume to maintain the oxygen partial pressure therein at a value preventing oxygen-inactivation of said hydrogenase by transferring a gaseous mixture comprising evolved hydrogen and oxygen from said volume into a separation zone, and
   in said zone, selectively diffusing the transferred hydrogen through a heated semipermeable membrane while maintaining across said zone a magnetic field gradient biasing the transferred oxygen away from said membrane.

8. The method of claim 7 further characterized by maintaining across said body of water and said volume a magnetic field gradient promoting transport of oxygen from said water into said volume.

9. A process for producing gaseous hydrogen, comprising:
   providing a reactor containing a body of water, said water containing biophotolytic material incorporating hydrogenase as a hydrogen-liberator, said reactor being isolated from atmosphere and having a volume for receiving gases evolved from said water,
   exposing said material in said reactor to visible light to effect photosynthetic splitting of said water into gaseous hydrogen and oxygen,
   pumping on said volume to maintain the oxygen partial pressure therein at a value preventing oxygen-inactivation of said hydrogenase by withdrawing a gaseous mixture comprising evolved hydrogen and oxygen therefrom, thus cooling said body of water by evaporating water therefrom,
   directing the withdrawn gases through a hydrophobic membrane blocking the flow of water vapor but permitting oxygen and hydrogen to flow therethrough, and directing the outflow from said membrane into a hydrogen-recovery zone.

10. The process of claim 9 further characterized by providing means for selectively directing evolved gas flow through a bypass around said membrane.

11. The process of claim 10 further characterized by monitoring the temperature of said body of water and opening said bypass to flow when said temperature exceeds a selected value.

* * * * *